United States Patent [19]

Takahashi

[11] Patent Number: 5,612,062
[45] Date of Patent: Mar. 18, 1997

[54] MEANS FOR HOLDING STAMPER PLATE IN MOLDING METAL DIE

[75] Inventor: Mitsuo Takahashi, Matsudo, Japan

[73] Assignee: Seikoh Giken Co., Ltd., Matsudo, Japan

[21] Appl. No.: 655,484

[22] Filed: May 30, 1996

[30] Foreign Application Priority Data

Oct. 25, 1995 [JP] Japan ................................. 7-300618

[51] Int. Cl.[6] ................................................. B29C 45/17
[52] U.S. Cl. .................... 425/3; 425/192 R; 425/193; 425/810; 425/DIG. 33; 425/DIG. 60
[58] Field of Search ......................... 425/3, 190, 192 R, 425/193, 810, DIG. 33, DIG. 60

[56] References Cited

U.S. PATENT DOCUMENTS

| | | | |
|---|---|---|---|
| 4,472,124 | 9/1984 | Kashihara et al. | 425/3 |
| 4,737,096 | 4/1988 | Poorten | 425/190 |
| 4,907,956 | 3/1990 | Ezaki et al. | 425/810 |
| 5,135,376 | 8/1992 | Watanabe et al. | 425/810 |
| 5,326,240 | 7/1994 | Kudo et al. | 425/3 |

FOREIGN PATENT DOCUMENTS

| | | |
|---|---|---|
| 2-60502 | 12/1990 | Japan. |
| 2-295726 | 12/1990 | Japan. |
| 5-185475 | 7/1993 | Japan. |

*Primary Examiner*—James P. Mackey
*Attorney, Agent, or Firm*—Spencer & Frank

[57] ABSTRACT

In a means for holding a stamper plate in a molding metal die so that the stamper plate can be easily mounted on and dismounted from the surface of a disc cavity plate, the means comprises the stamper plate having a hole at the center thereof and composed of a ferromagnetic substance, a stamper plate bush having an engaging shaft portion to be engaged with the center hole of the stamper plate in a molding cavity and disposed at the center of the disc cavity plate on the side where the stamper plate is mounted, a magnetic flux generating means disposed in a ring shape around the outer periphery of the engaging shaft portion of the stamper plate bush in the disc cavity plate for generating magnetic flux in a direction vertical to the surface of the stamper plate coupled with the engaging shaft portion, a vacuum hole defined to the disc cavity plate in correspondence to the portion of the stamper plate where no information is recorded for vacuuming the rear surface of the stamper plate, and an air passage defined to the disc cavity plate for connecting the vacuum hole to a vacuum means. The stamper plate is supported on the disc cavity plate by a magnetic force and a vacuuming force.

7 Claims, 3 Drawing Sheets

MEANS FOR HOLDING STAMPER PLATE IN MOLDING METAL DIE

BACKGROUND OF THE INVENTION

1. Field of the Invention

The present invention relates to a means for holding a stamper plate in a molding metal die for injection molding optical disc substrates such CD-ROMs and the like using the stamper plate.

2. Description of the Related Art

There is known an optical disc substrate injection molding metal die for moving a stamper plate press bush using cam shaft. Refer to, for example, Japanese Patent Publication Laid-Open No. 2-295726.

FIG. 5 is a cross sectional view showing an injection molding state of a conventional optical disc substrate injection molding metal die for moving a stamper plate press bush using a cam shaft.

FIG. 6 is a schematic cross sectional view showing a state that a stamper plate press bush is moved by a conventional apparatus. A center hole is defined at the center of a disc-shaped stamper plate 1. A stamper plate mounting bush 2 includes a barrel portion 2a having an outside diameter slightly smaller than the center hole of the stamper plate 1 and a flange 3 having an outside diameter larger than the center hole of the stamper plate 1 at the lower end thereof. Further, a cutout 9 is defined to at the upper end of the stamper plate mounting bush 2. A fixed side plate 6 is provided with a fixed side disc cavity plate 4 and a hole 5 for receiving the bush 2 is defined at the center of the fixed side disc cavity plate 4. The fixed side plate 6 rotatively supports two engaging rods 7 which are engaged with the cutout 9 of the bush 2. The two engaging rods 7, 7 include planes 8, 8 each having a semicircular cross section and are coupled with each other so that they are rotated in synchronism. A spool bush 10 is inserted into the center hole of the bush 2 and has an injection hole 11 for a molten resin defined at the center thereof. A ring-shaped cooling water passage 12 is disposed to the fixed side disc cavity plate 4 in a state that it is in contact with the fixed side plate 6. A movable side disc cavity plate 17 is fixed to a movable side plate 19. A punch 18 is supported at the center of the movable side disc cavity plate 17 so as to move upward/downward in the drawing so that the punch 18 punches out a center hole of a disc substrate.

The stamper plate 1 is put into the bush 2 when an injection molding is carried out so that the outer periphery of the hole of the stamper plate is pressed by the flange 3 of the bush 2. As shown in FIG. 5, the bush 2 is engaged with the planes 8, 8 of the semi-circular cross sections of the two engaging rods 7, 7 and pressed thereby in injection molding. Next, steps of procedure for removing the stamper plate 1 will be described with reference to FIG. 6. A disc substrate molded member 20 is removed by opening the die. As shown in FIG. 6, when the two engaging rods 7 are turned in the direction of an arrow in the drawing, the planes 8 of the engaging rods 7 are disengaged once from the cutout 9 of the stamper plate mounting bush 2 and pushes the upper surface of the bush 2 in the drawing. With this operation, the stamper plate mounting bush 2 is pushed out from the center hole 5 of the fixed side disc cavity plate 4 as shown by the drawing. Thus, a worker can take out the stamper plate 1 by hand. This conventional example is a system for mechanically mounting and dismounting the stamper plate 1 by the stamper plate mounting bush 2 and can securely mount the stamper plate. However, since the example uses the two rods and a device for driving them is needed, the example has the following problems.

That is, the use of the two rods and the provision of the device for driving the rods in relation to the metal die prevent the reduction of size and weight of the die. Further, the provision of the rods and the driving device thereof in relation to the die restricts the design of the cooling water passage. Further, a certain degree of skill is required to mount and dismount the stamper plate.

FIG. 3 is a schematic cross sectional view showing another conventional example of an optical disc substrate injection molding metal die. The conventional apparatus (for example, Japanese Patent Publication No. 2-60502) is arranged to support the stamper plate using a vacuum unit.

A spool bush 30 is disposed at the center of a disc side cavity plate 29. A stamper plate 25 is supported on a stamper plate side disc cavity plate 21 as described later. The stamper plate side disc cavity plate 21 has concentric circular grooves 22, 23 defined at the center and around the outer peripheral portion thereof. A cylindrical bush 26 is disposed at the center of the stamper plate side disc cavity plate 21 and a punch 28 is provided with the cylindrical bush 26 to punch out the center hole of a disc substrate molded body 20. The cylindrical bush 26 has a peripheral portion 27 defined at the extreme end thereof, the peripheral portion 27 being inserted into the center hole of the stamper plate 25.

The aforesaid concentric circular grooves 22, 23 defined at the center and around the outer peripheral portion of the stamper plate side disc cavity plate 21 are coupled with a not shown vacuum pump through an communicating hole 24 to vacuum one surface of the stamper plate 25 onto the stamper plate side disc cavity plate 21 to thereby support the stamper plate 25 on the cavity plate 21. This conventional apparatus has an advantage that the stamper plate 25 can be simply removed from the disc cavity plate 21 by stopping vacuuming. However, this conventional apparatus has the following problem. That is, the cavity of the disc substrate molding metal die must be vacuumed to provide the density of a molten resin filled into the cavity with improved uniformity. In this case, since a suction force acting on the rear surface of the stamper plate 25 is cancelled and does not function, there is a possibility that the stamper plate 25 is removed from the cylindrical bush 26 by the vibration and impact of a molding machine operating at a high speed. Further, the stamper plate 25 must be vacuumed and supported by driving the vacuum pump so far as it is mounted even if a molding operation is interrupted.

FIG. 4 is a schematic cross sectional view showing a further conventional example of an optical disc substrate injection molding metal die. The conventional example (for example, Japanese Patent Publication Laid Open No. 5-185475) supports a stamper plate using an electromagnet. A cylindrical bush 34 is disposed at the center of a disc cavity plate 31 on the side of the stamper plate and a nozzle bush 35 is disposed at the center thereof. A magnet or electromagnet 32 is disposed to the disc cavity plate 31. A punch 37 for punching out the center hole of the stamper plate 33 is provided with the other disc cavity plate 36.

This conventional example is arranged such that the stamper plate 33 is magnetically attracted by the disc-shaped electromagnet or magnet 32 disposed on the stamper plate side disc cavity plate 31 making use of that the stamper plate is composed of nickel as a ferromagnetic substance. However, this conventional example has the following problem. First, since this type of the molding die is subjected to a temperature variation up to 200° C., a high pressure sliding friction force is caused between the front surface of the disc cavity plate and the rear surface of the stamper plate by the expansion and contraction of the stamper plate resulting from the temperature variation. Thus, the occurrence of scratches produced on the rear surface of the stamper plate must be prevented. Further, the corrosion of the surface of the disc cavity plate caused by a gas generated from a resin material must be prevented. To cope with this problem, an ordinary disc substrate molding metal die apparatus employs martensitic stainless steel as a material of its disc cavity plate, subjects the stainless steel to a heat treatment to provide it with a hardness of $H_RC$ 55–60 and further subjects the resulting stainless steel to a corrosion resistant surface hardening treatment such as the coating of a Ti-N hardening film having a hardness of $H_V$ 2000 with the surface roughness of the steel finished to 10 nanometers or less. In the disc substrate molding metal die apparatus shown in the above conventional example, a magnet which is much softer than that used in a conventional metal die must be buried to the surface of the disc cavity plate. The occurrence of the high pressure sliding friction force between the front surface of the disc cavity plate and the rear surface of the stamper plate cannot be prevented on the surface of the magnet.

Further, unless the surface of the disc cavity plate of the substrate molding metal die is cooled without causing a variation at an equal speed, there is a possibility that the quality of a molded disc substrate is damaged. With respect to this point, uniformity of cooling also becomes a problem in a conventional substrate molding metal die using the above monoblock cavity plate whose surface configuration is relatively uniform.

Therefore, when a foreign body such as a magnet or the like is interposed between a cooling water passage disposed on the rear surface of a disc cavity plate and the front surface of thereof as the case of the conventional example, it is very difficult to analyze a thermal distribution, by which a design is made difficult.

Even if it is supposed that the above difficulty can be solved, the above reference does not explain how the stamper plate is removed. Since it is difficult for a worker to exfoliate the stamper plate without damaging it, it is contemplated that any means for exfoliating the stamper plate without damaging it must be developed in relation to the above metal die apparatus.

An object of the present invention is to provide a means for holding a stamper plate in a molding metal die in such a manner that the stamper plate can be easily mounted to and dismounted from the surface of a disc cavity plate.

SUMMARY OF THE INVENTION

To achieve the above object, a means for holding a stamper plate in a molding metal die according to the present invention comprises the stamper plate having a hole at the center thereof and composed of a ferromagnetic substance, a stamper plate bush having an engaging shaft portion to be engaged with the center hole of the stamper plate in a molding cavity and disposed at the center of a disc cavity plate on the side where the stamper plate is mounted, magnetic flux generating means disposed in a ring shape around the outer periphery of the engaging shaft portion of the stamper plate bush in the disc cavity plate for generating magnetic flux in a direction vertical to the surface of the stamper plate coupled with the engaging shaft portion, a vacuum hole defined to the disc cavity plate in correspondence to the portion of the stamper plate where no information is recorded for vacuuming the rear surface of the stamper plate, and an air passage defined to the disc cavity plate for connecting the vacuum hole to a vacuum means, wherein the stamper plate is supported on the disc cavity plate by a magnetic force and a vacuuming force.

In the means for holding a stamper plate in a molding metal die, the vacuum hole can be composed of a ring-shaped groove defined to the outer edge portion of the disc cavity plate and having a diameter smaller than the outside diameter of the stamper plate.

In the means for holding a stamper plate in a molding metal die, the vacuum hole can be composed of a ring-shaped groove defined to the disc cavity plate and having a diameter slightly larger than the inside diameter of the stamper plate and further the vacuum hole can be composed of a gap of 0.02 mm or more defined between the outer periphery of the stamper plate bush and the inner periphery of the center hole of the disc cavity plate.

In the means for holding a stamper plate in a molding metal die, the magnetic flux generating means can be composed of a non-magnetic cylindrical member and a permanent magnet supported by the cylindrical member.

In the means for holding a stamper plate in a molding metal die, the non-magnetic cylindrical member can be composed of nonferrous alloy or ferrite type stainless steel and the permanent magnet is composed of a neodymium (Nd-Fe-B) type, samarium cobalt (Sm-Co) type or alnico (Al-Ni-Co) type material.

Further, the magnetic flux generating means can be composed of a solenoid coil wound around the outer periphery of the extreme end of the stamper plate bush.

DESCRIPTION OF PREFERRED EMBODIMENTS

Figure 1:
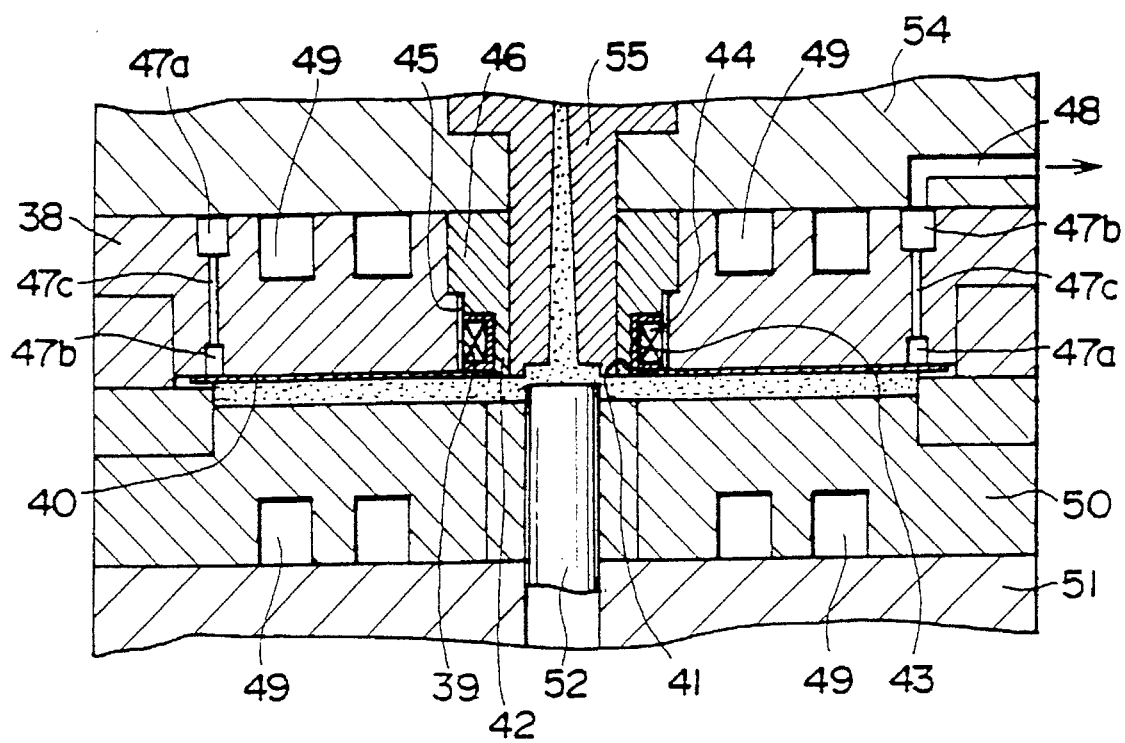
FIG. 1 is a cross sectional view of an embodiment of an optical disc substrate injection molding metal die using an embodiment of a means for holding a stamper plate in the molding die according to the present invention.

The present invention will be described below in more detail with reference to the drawings and the like. FIG. 1 is a cross sectional view showing a first embodiment of an optical disc substrate injection molding metal die according to the present invention by cutting the metal die along a plane including the center thereof. A fixed side disc cavity plate 38 is secured to a fixed side mounting plate 54. A stamper plate bush 46 having an end to be inserted into the center hole of a stamper plate is inserted into the center hole 39 of the fixed side disc cavity plate 38. A nozzle bush 55 is held by passing through the center of the fixed side disc cavity plate 38 and the stamper plate bush 46. A stepped shaft portion 42 is formed to an end of the stamper plate bush 46. A ring-shaped permanent magnet 44 is secured to the stepped shaft portion 42 by a ring-shaped collar 43. Note, the permanent magnet 44 is composed of a neodymium (Nd-Fe-B) type magnetic material. The permanent magnet may be composed of samarium cobalt (Sm-Co) type or alnico (Al-Ni-Co) type material. A gap 45 is defined between the surface of the permanent magnet secured by the ring-shaped collar 43 and the inner surface of the center hole 39 of the fixed side disc cavity plate 38 and the gap 45 is kept to 0.02 mm in this embodiment.

The stamper plate 40 is inserted into the stepped shaft portion 42 at the extreme end of the stamper plate bush 46 through the center hole 41 thereof.

Cooling groove passages 49, 49 are defined to the fixed side disc cavity plate 38 and further a ring-shaped groove 47a having a diameter smaller than that of the stamper plate 40 are defined thereto. The ring-shaped groove 47a communicates with a similar ring-shaped groove 47b defined on the surface of the fixed side disc cavity plate 38 opposite to that on which the ring-shaped groove 47a is defined through a passage 47c. The ring-shaped groove 47b is coupled with an external vacuum unit through a hole 48 defined to the fixed side mounting plate 54.

Note, since a stamper plate is composed of a ferromagnetic substance containing nickel, the stamper plate 40 is attracted to the fixed side disc cavity plate 38 by the inner periphery of the stamper plate 40 and the magnetic force of the ring-shaped permanent magnet 44. The following two circuits are formed as magnetic circuits.

First magnetic circuit: pole on the stamper plate side of the permanent magnet 44→inner periphery of the stamper plate 40→stepped shaft portion 42→stamper plate bush 46 →the other pole of the permanent magnet 44 (upper side in the drawing); and Second magnetic circuit: pole on the stamper plate side of the permanent magnet 44→inner periphery of the stamper plate 40→fixed side disc cavity plate 38→stamper plate bush 46→the other pole of the permanent magnet 44 (upper side in the drawing).

In this embodiment, the stamper plate is vacuumed in addition to that it is attracted by the magnetic force. As a result, even if the drive of the external vacuum pump used for vacuuming is stopped, since the inner periphery of the stamper plate is securely attracted and held by the ring-shaped magnet 44, a force by which the stamper plate is attracted prevails at all times, thus the removal of the stamper plate described in the conventional example is not caused.

The permanent magnet 44 is disposed to the small diameter stepped portion 42 at the extreme end of the stamper plate bush 46 which is detachably inserted into the center hole 39 of the fixed side disc cavity plate 38. In this embodiment, the basic arrangement of a usually employed optical disc substrate injection molding metal die need not be almost changed with respect to a material of the disc cavity plate, surface treatment and a structure of a cooling water passage, different from the aforesaid conventional example (having a large area magnet buried to the surface of a disc cavity plate). The stamper plate 40 is preferably mounted by a vacuuming method. Further, the stamper plate 40 can be easily removed in such a manner that the magnetic pole surface of a ring-shaped magnet, which is somewhat stronger than the aforesaid permanent magnet mounted on the metal die and has a small outside diameter, is caused to come into contact with the no signal surface region of the disc substrate and attract it.

Figure 2:
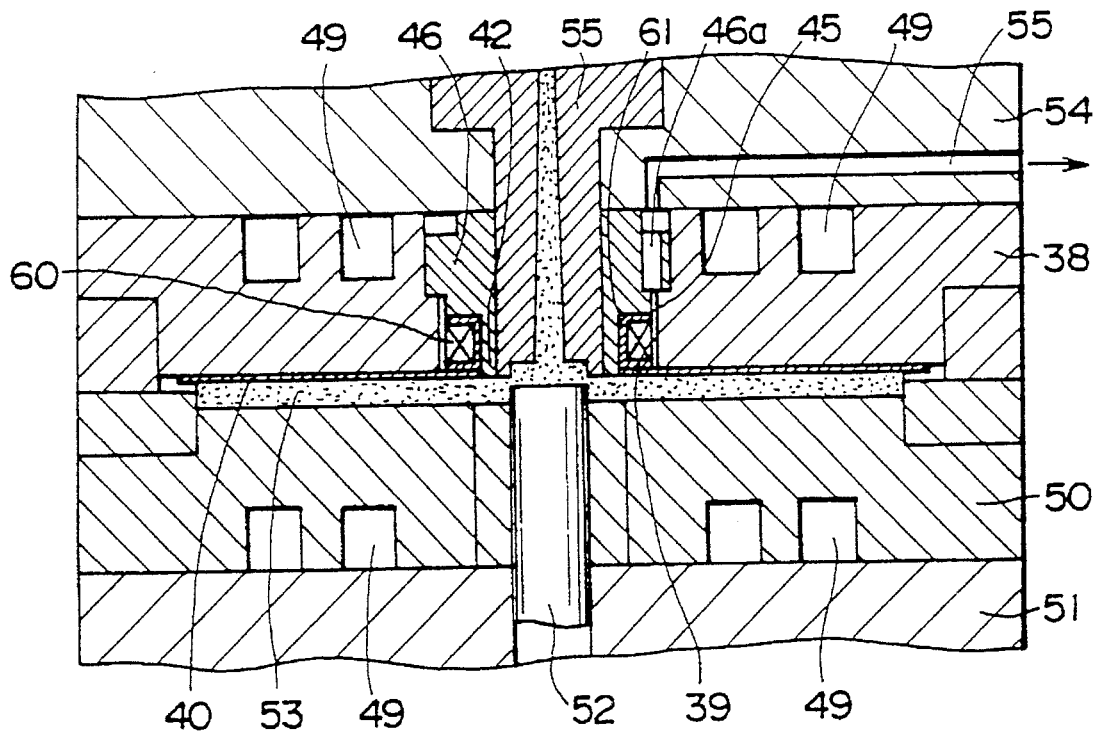
FIG. 2 is a cross sectional view of the embodiment of the optical disc substrate injection molding metal die using another embodiment of the means for holding a stamper plate in the molding die according to the present invention.
Figure 3:
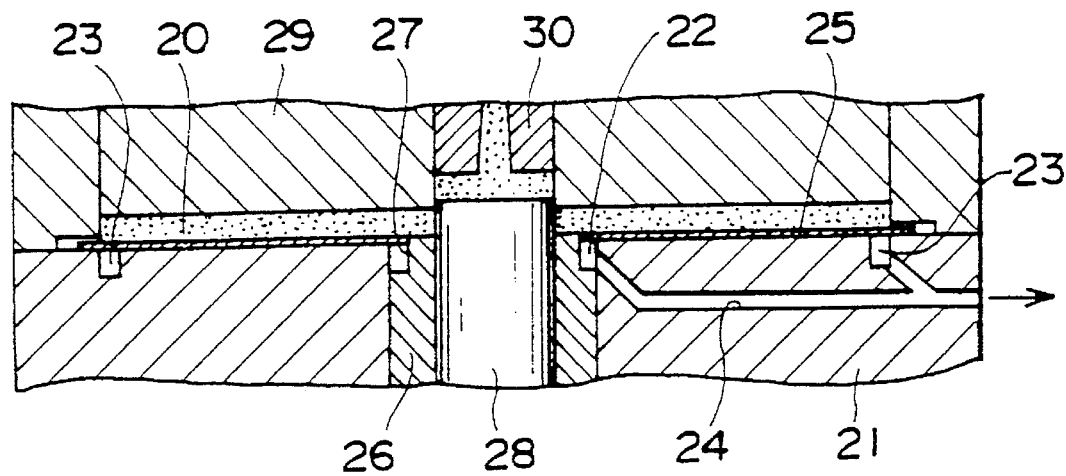
FIG. 3 is a schematic a cross sectional view of a conventional example of the conventional optical disc substrate injection molding metal die.
Figure 4:
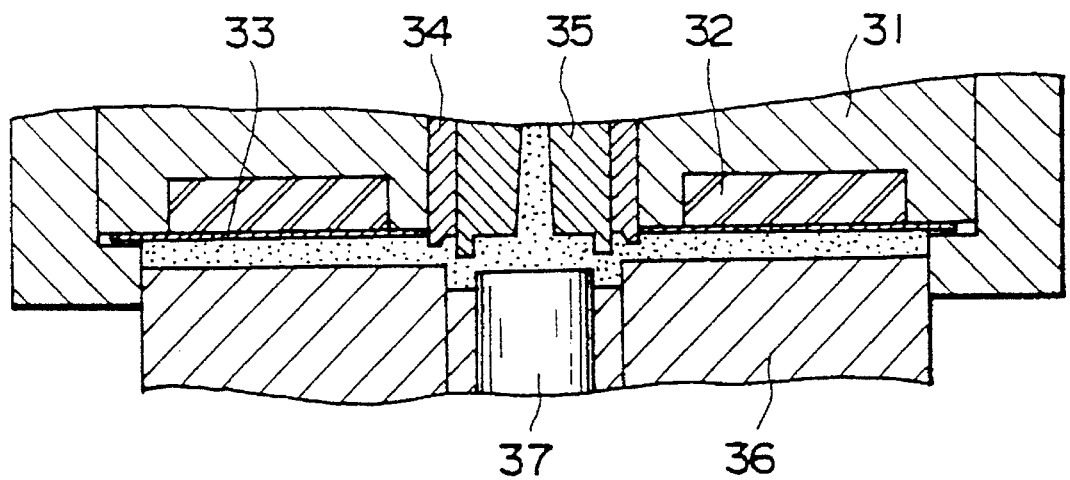
FIG. 4 is a schematic a cross sectional view of a further example of the conventional example of the optical disc substrate injection molding metal die.
Figure 5:
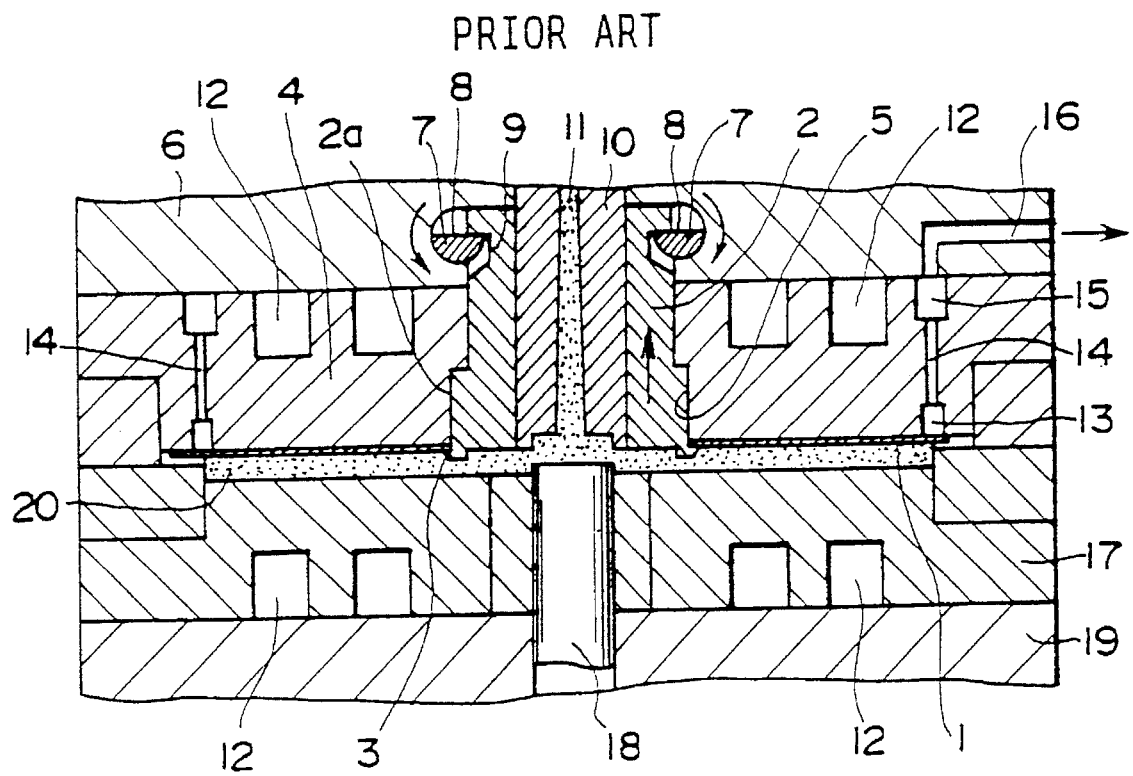
FIG. 5 is a cross sectional view of an optical disc substrate injection molding metal die for moving a stamper plate pressing bush using a conventional cam shaft when the metal die is in an injection molding state.
Figure 6:
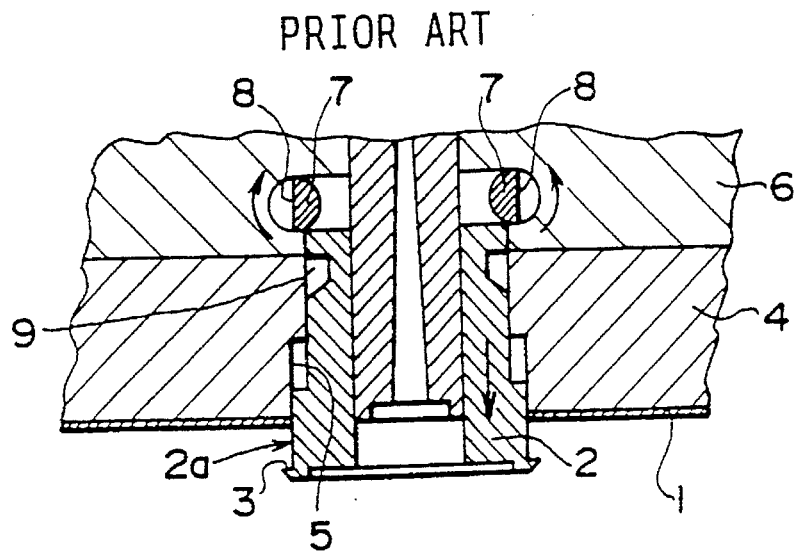
FIG. 6 is a cross sectional view showing a state that the stamper plate pressing bush is moved using the conventional apparatus shown in FIG. 5.

FIG. 2 is a cross sectional view showing a second embodiment of the optical disc substrate injection molding metal die according to the present invention by cutting the metal die along a plane including the center thereof. In the embodiment, a solenoid coil 60 is used in place of the aforesaid permanent magnet as a stamper plate holding means. The solenoid coil 60 is disposed around the outer periphery of the stepped shaft portion 42 at the extreme end of the above stamper plate bush 46 through a coil bobbin 61. A passage 46a is also defined to the stamper plate bush 46 and communicates to a gap between the solenoid coil 60 and the inner periphery of the fixed side disc cavity plate 38. The passage 46a is connected to the external vacuum unit or the like through a passage 55. The embodiment is arranged such that the stamper plate is vacuumed from the gap 45 (0.02 mm or more) defined between the outer peripheries of the solenoid coil 60 and the stepped shaft portion 42 of the stamper plate bush and the inner periphery of the center hole 39 of the disc cavity plate 38 through the communication hole 46a and the vacuum hole 55.

When the solenoid coil 60 is energized in the second embodiment, the following magnetic circuits are formed.

First magnetic circuit: pole on the stamper plate side generated by the solenoid coil 60→inner periphery of the stamper plate 40→stepped portion 42 of the stamper plate bush→stamper plate bush 46→the other pole generated by the solenoid coil 60 (upper side in the drawing); and Second magnetic circuit: pole on the stamper plate side generated by the solenoid coil 60→inner periphery of the stamper plate 40→fixed side disc cavity plate 38→stamper plate bush 46→the other pole generated by the solenoid coil 60 (upper side in the drawing). In this embodiment, the stamper plate is vacuumed in addition to that it is attracted by a magnetic force. As a result, even if the drive of the external vacuum pump used for vacuuming is stopped, since the inner periphery of the stamper plate is securely attracted and held by the magnetic force generated by the solenoid coil 60, a force by which the stamper plate is attracted and held prevails at all times, thus the removal of the stamper plate described in the conventional example is not caused. The stamper plate can be easily removed by changing a pressure in the gap while changing polarity when the solenoid coil is energized.

As described above in detail, in the means for holding the stamper plate in the molding metal die according to the present invention, the magnetic flux attracting means is disposed at the center of the stamper plate and no attracting means is buried to almost all the portion of the disc cavity plate. As a result, a temperature is increased and decreased on the surface of the disc cavity plate without causing a variation. Various modifications can be made to the embodiments described above in detail within the scope of the present invention. The present invention can be also applied to the molding of an information disc other than the optical disc described above.

What is claimed is:

1. Means for holding a stamper plate in a molding metal die, comprising:

said stamper plate having a hole at the center thereof and composed of a ferromagnetic substance;

a stamper plate bush having an engaging shaft portion to be engaged with the center hole of said stamper plate in a molding cavity and disposed at the center of a disc cavity plate on the side where said stamper plate is mounted;

magnetic flux generating means disposed in a ring shape around the outer periphery of the engaging shaft portion of said stamper plate bush in said disc cavity plate for generating magnetic flux in a direction vertical to the surface of said stamper plate coupled with said engaging shaft portion;

a vacuum hole defined to said disc cavity plate in correspondence to the portion of said stamper plate where no information is recorded for vacuuming the rear surface of said stamper plate; and an air passage defined to said disc cavity plate for connecting said vacuum hole to vacuum means, wherein said stamper plate is supported on said disc cavity plate by a magnetic force and a vacuuming force.

2. Means for holding a stamper plate in a molding metal die according to claim 1, wherein said vacuum hole is composed of a ring-shaped groove defined to the outer edge portion of said disc cavity plate and having a diameter smaller than the outside diameter of said stamper plate.

3. Means for holding a stamper plate in a molding metal die according to claim 1, wherein said vacuum hole is composed of a ring-shaped groove defined to said disc cavity plate and having a diameter slightly larger than the inside diameter of said stamper plate.

4. Means for holding a stamper plate in a molding metal die according to claim 3, wherein said vacuum hole is composed of a gap of 0.02 mm or more defined between the outer periphery of said stamper plate bush and the inner periphery of the center hole of said disc cavity plate.

5. Means for holding a stamper plate in a molding metal die according to claim 1, wherein said magnetic flux generating means is composed of a non-magnetic cylindrical member and a permanent magnet supported by said cylindrical member.

6. Means for holding a stamper plate in a molding metal die according to claim 4, wherein said non-magnetic cylindrical member is composed of nonferrous alloy or ferrite type stainless steel and said permanent magnet is composed of a neodymium (Nd-Fe-B) type, samarium cobalt (Sm-Co) type or alnico (Al-Ni-Co) type material.

7. Means for holding a stamper plate in a molding metal die according to claim 1, wherein said magnetic flux generating means is composed of a solenoid coil wound around the outer periphery of the extreme end of said stamper plate bush.

* * * * *